United States Patent

Salmen et al.

(10) Patent No.: US 9,459,887 B2
(45) Date of Patent: Oct. 4, 2016

(54) AUTOMATIC GRAPHICAL USER INTERFACE CREATION

(75) Inventors: Larry J. Salmen, Fort Collins, CO (US); Kip Oliver Morgan, Laporte, CO (US)

(73) Assignee: NCR Corporation, Duluth, GA (US)

( * ) Notice: Subject to any disclaimer, the term of this patent is extended or adjusted under 35 U.S.C. 154(b) by 306 days.

(21) Appl. No.: 13/362,850

(22) Filed: Jan. 31, 2012

(65) Prior Publication Data

US 2013/0198662 A1    Aug. 1, 2013

(51) Int. Cl.
*G06F 3/048* (2013.01)
*G06F 9/44* (2006.01)

(52) U.S. Cl.
CPC .................... *G06F 9/4443* (2013.01)

(58) Field of Classification Search
CPC ... G06F 3/048; G06F 17/3087; G06Q 30/02; G06Q 30/0222; G06Q 30/00
USPC ........................ 715/744; 705/14.23, 15, 26.1
See application file for complete search history.

(56) References Cited

U.S. PATENT DOCUMENTS

| | | | |
|---|---|---|---|
| 2003/0063120 A1* | 4/2003 | Wong et al. | 345/746 |
| 2004/0158499 A1* | 8/2004 | Dev et al. | 705/26 |
| 2008/0189172 A1* | 8/2008 | Goren et al. | 705/14 |
| 2009/0259553 A1* | 10/2009 | Carroll | G06Q 20/20 705/15 |
| 2010/0293448 A1* | 11/2010 | Rand et al. | 715/206 |
| 2011/0165552 A1* | 7/2011 | Foster | 434/430 |
| 2013/0091440 A1* | 4/2013 | Kotler et al. | 715/753 |
| 2013/0282519 A1* | 10/2013 | Xavier et al. | 705/26.7 |

OTHER PUBLICATIONS

SubWay Restaurant Web Site Information on Dec. 27, 2011.*

* cited by examiner

*Primary Examiner* — Peiyong Weng
(74) *Attorney, Agent, or Firm* — Schwegman, Lundberg & Woessner

(57) ABSTRACT

Techniques for automated graphical user interface (GUI) creation and/or rendering are provided. Establishments are defined via items for sale and rules defining workflow processing for purchasing the items. Each establishment representing a sub hierarchy. A GUI is rendered to represent a custom hierarchy of the sub hierarchies and presented to a user. The user interacts with the GUI to select a specific establishment and perform a specific transaction with that establishment in accordance with that establishment's items for sale and rules.

19 Claims, 3 Drawing Sheets

AUTOMATIC GRAPHICAL USER INTERFACE CREATION

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention.

Furthermore, the traditional definition of a kiosk has become blurred in recent years because transactions can be performed on consumer devices. That is, smart phones, tablets, and laptops are often used to perform transactions with enterprises. For the most part these transactions occur via an Internet connection with a website for an enterprise. However, in recent years more and more enterprises are permitting consumers to transact with the enterprises using the consumers' smart phones via Blue Tooth or Near Field Communication (NFC) to interact with systems of these enterprises while the consumers are in the retail store.

One industry that has experienced very little automation with respect to a kiosk-driven transaction is the restaurant industry. Major reasons for the lack of automation in the restaurant industry include: the variety of food choices available across the industry, the plethora of mechanisms used to order food across the industry; and the customized promotions that may exists at some establishments but not at others even when the establishments are part of the same fast food chain.

Restaurants by and large include websites for customers to order carry out but lack portable interfaces for ordering on site while at a restaurant on customer devices such as tablets and phones. Generally, a website interface designed for a laptop does not render well to smaller devices, such as phones and tablets. Some restaurants have spent a lot of time and money trying to customize interfaces and the associated workflow to permit onsite ordering via customer devices but heretofore with little to no success.

Moreover, the restaurant industry is ripe for automation since it is a service-intensive business that is fraught with human error and time delays that substantially impact the customer's perception of an establishment. Additionally, if the number of servers could be reduced and quality and timeliness of service improved, then the cost of eating out could be lowered and the customer's experience improved.

SUMMARY

In various embodiments, techniques for automated graphical user interface (GUI) rendering are presented. According to an embodiment, a method for GUI rendering is discussed.

Specifically, a graphical user interface (GUI) is customized for a display on a target device in accordance with a criterion. Next, a hierarchy of establishments is presented on the display and a user dynamically accesses the hierarchy, via the GUI. Then, site specific GUI information and workflow processing are acquired for a specific site that identifies a specific establishment; the specific site selected by the user using the GUI. Finally, the GUI is driven in accordance with selections of the user and the workflow processing to complete a transaction between the user and the specific establishment.

DETAILED DESCRIPTION

Figure 1:
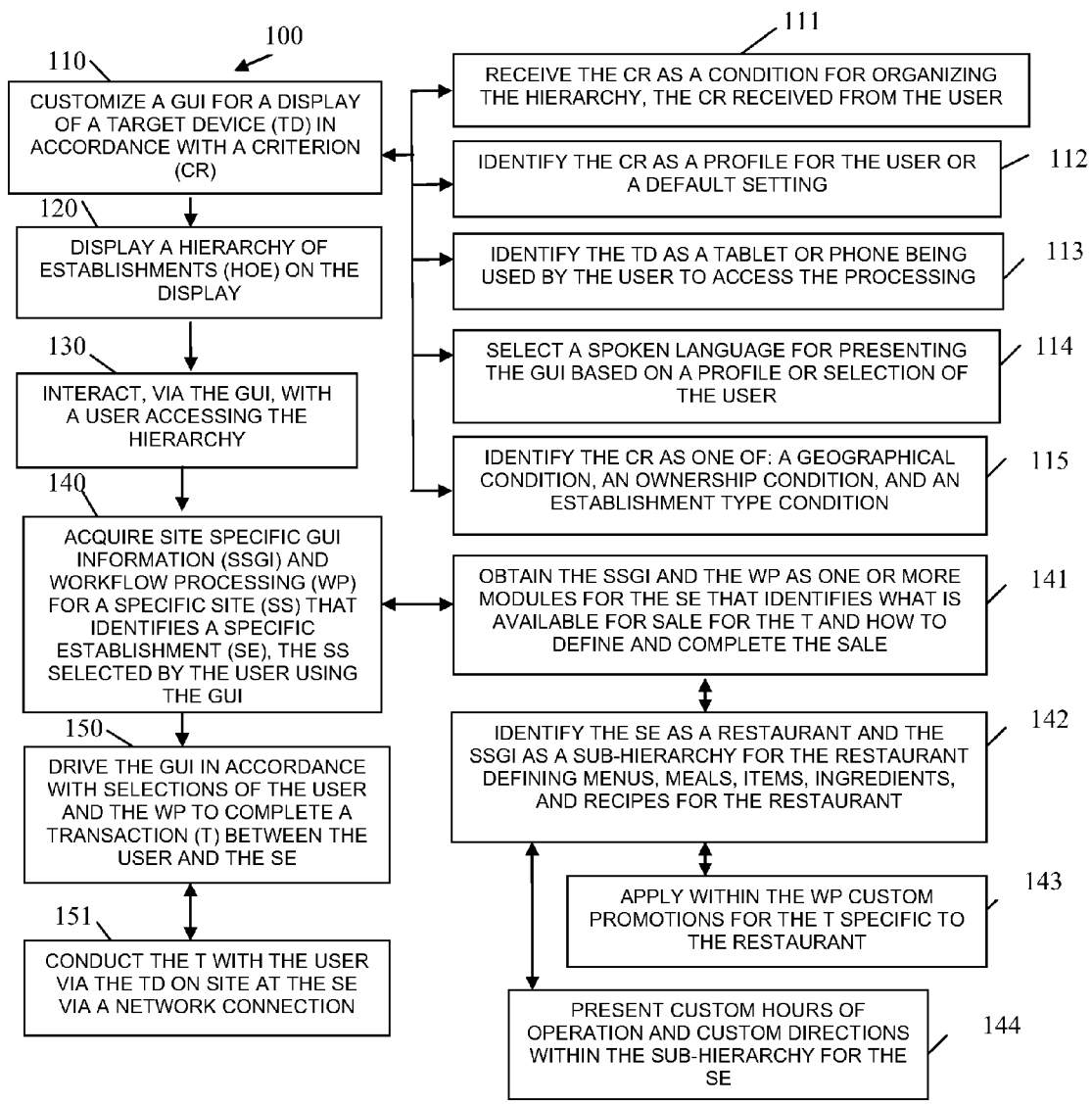
FIG. 1 is a diagram of a method for GUI rendering, according to an example embodiment.

FIG. 1 is a diagram of a method 100 for GUI rendering, according to an example embodiment. The method 100 (herein after "GUI renderer") is implemented, programmed, and resides in a non-transitory computer-readable medium as executable instructions that are executed by more or more processors of a network; each processors specifically configured to execute the GUI renderer. Moreover, the GUI renderer is operational over a network, the network is wired, wireless, or a combination of wired and wireless.

Initially, various aspects of the GUI render are discussed within the context of the restaurant industry for a generic implementation application to any restaurant. It is noted that other embodiments of the invention can be used within other industries and as such some embodiments herein are used in any retail or service industry to automate the workflow and GUI rendering for transactions via any device, such as smart phones, tablets, and the like.

As stated before, a significant issue with automation within the restaurant industry is the high cost of creating customized food ordering screen layouts and work flows for each Quick Service Restaurant (QSR) customer's kiosk menu. In the past, some restaurants spent significant time to create appealing and functional food ordering GUIs for kiosks, tablets, and mobile order points. These GUIs and the associated ordering work flows (like the multiple steps in ordering a meal) take significant graphic artist and analyst time to create, test and debug. Previous authoring approaches allowed near freeform creation of a GUI layout and workflow to suit any chain customer's desires. The data base for a customer GUI took several weeks to create, and required a significant amount of testing and debugging. As a result, few customers could be convinced to pay for this up front cost, especially for a small pilot project.

The techniques herein utilize is the unique combination of three approaches.

The first approach is creating a Food Menu Design that works for quick service and fast casual dining and is client device independent (works for four ordering points—kiosk, web ordering, tablet, and mobile phones). This Food Menu design is lean (includes only the needed elements), but robust enough to cover all types of QSR food ordering work flows. This design completely specifies both WHAT is ordered, and HOW it is ordered.

The second approach is the use of an N level hierarchical tree to specify a chain of restaurants. This hierarchy can have multiple levels such as COUNTRY, REGION, STATE, and SITE. Assigned to each specific site are one or more modules that specify which food items, meal periods, languages and promotions are being sold at that site. Differences between sites of a large chain can be specified by varying the modules associated with any site in this hierarchy.

The third approach is the auto creation of the entire GUI presentation including work flow from only the Food Menu Design, modules specifying rules for the specific site, and, in an embodiment, a Hypertext Markup Language version 5 (HTML5) template. This eliminates the need to create custom keyboard or screen layouts for each customer chain, or for each specific site in the chain.

Food Menu Design—First Approach

The Food Menu Design includes hierarchies of Menus, Categories, Meals, Items, Ingredients and Recipes that can represent any food ordering process at a Quick Service or Fast Casual restaurant. This design is capable of handling all food variants. Multiple restaurant menu concepts from pizza to burgers to chicken can be organized in this pattern.

This design, in an embodiment, incorporates Unicode Multilingual localization of the GUI, where multiple customers at the same kiosk can order in different languages at runtime.

For example, a Food Menu Design for Jack in the Box® could be pseudo coded as:

1. Combo Meals Category
   a. Jacks Spicy Chicken
      i. Spicy Chicken sandwich
      ii. Optional Go Large offer
      iii. Medium Fries
      iv. Medium Drink Category
      v. Dessert Offer
   b. Jumbo Jack
   c. Jacks Outlaw Burger
   d. Sourdough Jack
   e. Bourbon BBQ Steak
   f. Sirloin Cheeseburger
2. Medium Drinks Category
   a. Coca Cola
   b. Diet Coke
   c. Barqs Root beer
   d. Hi C
   e. Dr Pepper
   f. Shakes Category Hierarchical Tree to Specify a Chain of Restaurants The Hierarchical Tree outlines groups of stores organized any way the customer prefers. It can be organized geographically (Region, State, City, and Site), or by Ownership (Corp, Franchisee A, Franchisee B, . . . ), or by Concepts (Drive Thru Only stores, Full Service, etc.).

Modules are created that include one or more food items. These modules are assigned to a region, area, or a specific site. This approach efficiently specifies all the items that are sold in each store.

Auto Creation of the Entire GUI Presentation

The runtime web service creates a GUI presentation that steps a customer through the food ordering process (work flow) based on the Food Menu design, a HTML5 template (in an embodiment) and the site specific module differences. Thus, the customer only sees the food that is sold in that store.

As will be more fully discussed herein and below, the GUI renderer includes a variety of benefits not present in the industry, such as, but not limited to:

1) speed of GUI menu authoring creation (days rather than weeks), this process can further be expedited by importing the menu items directly from a Point-Of-Sale (POS) system;

2) the process is POS system independent;

3) high quality GUI presentation;

4) single server application that can be used on any of multiple order points (kiosk, tablet, web or mobile phone); and 5) reduces the incidence of data base creation errors and the testing required to identify and fix these errors.

It is within this initial context that the processing associated with the GUI renderer is now discussed with reference to the FIG. 1.

At 110, the GUI render customizes a GUI for a display of a target device in accordance with a criterion. The images, features, and buttons are customized for optimal presentation on the target device.

According to an embodiment, at 111, the GUI render receives the criterion as a condition for organizing the hierarchy. The criterion received by the user. In other words, the user initially interacts with a front-end interface, such as an initial website where criteria is shown to the user and the user selects a specific criterion for organizing the hierarchy.

In another case, at 112, the GUI render identifies the criterion as a profile for the user or a default setting for the GUI render. So, the user does not have to select a criterion; rather, the criterion can be based on a processing parameter associated with the GUI render or can be based on a previous set profile for the user.

In an embodiment, at 113, the GUI render recognizes or identifies the target device as a tablet or a phone being used by the user to access the GUI render.

In still another situation, at 114, the GUI render selects a spoken language for presenting the GUI based on a profile or selection of the user.

In yet another situation, at 115, the GUI render identifies the criterion as one of: a geographical condition, an ownership condition, and an establishment type condition. This was described above within the initial context of the restaurant implementation.

At 120, the GUI render displays a hierarchy of establishments on the display of the target device (and organized according to the user-supplied criterion or default/profile setting for the criterion).

At 130, the GUI render interacts, via the GUI, with the user; the user dynamically interfacing, via the target device, with the hierarchy defined within the GUI.

At 140, the GUI render acquires site-specific GUI information and workflow processing for a specific site. The specific site identifies a specific establishment and the specific site selected by the user that is interacting with the GUI, via the target device.

According to an embodiment, at 141, the GUI render obtains the site-specific GUI information and the workflow processing as one or more modules for the specific establishments that identifies what is available for sale for the transaction and how to define and complete the sale. This is specific information and workflow for the specific establishment. An example was presented above.

Continuing with the embodiment of 141 and at 142, the GUI render identify the specific establishment as a restaurant and the site-specific GUI information as a sub-hierarchy for the restaurant defining menus, meals, items, ingredients, and recipes for the restaurant.

Still continuing with the embodiment of 142 and at 143, the GUI render applies within the workflow processing custom promotions for the target specific to the restaurant.

Continuing with the embodiment of 142 and at 144, the GUI render presents custom hours of operation and custom directions within the sub-hierarchy for the specific establishment. A phone number and other information may be presented as well.

At 150, the GUI render drives the GUI in accordance with selections of the user and the work processing to complete a transaction between the user and the specific establishment.

According to an embodiment, at 151, the GUI render conducts the transaction with the user via the target device on site and at the specific establishment via a network connection. So, the user is at, say a restaurant and connects to the restaurant ordering system via WiFi, Blue Tooth, NFC, or some other mechanism (such as cellular). Next, the user accesses the GUI, locates the restaurant and its specific menu and workflow processing and proceeds to place an order and pay for it in accordance with rules defined by the restaurant. The user performs this transaction on a phone, for example.

Figure 2:
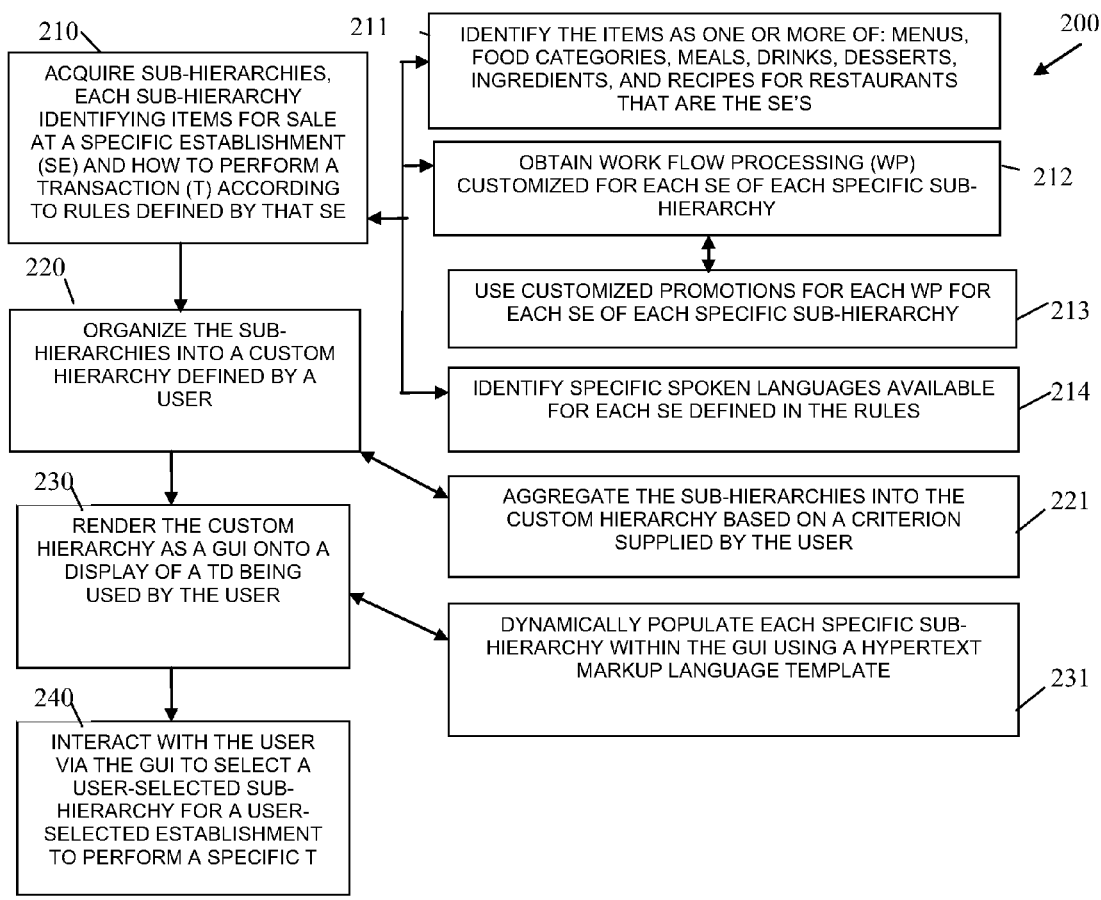
FIG. 2 is a diagram of another method for GUI rendering, according to an example embodiment.

FIG. 2 is a diagram of another method 200 for GUI rendering, according to an example embodiment. The method 200 (hereinafter "GUI manager") is implemented as instructions programmed and residing on a non-transitory computer-readable (processor-readable) storage medium and executed by one or more processors. The processors are specifically configured and programmed to process the mode GUI manager. In an embodiment, the GUI manager may operate over a network. The network is wired, wireless, or a combination of wired and wireless.

In an embodiment, the GUI manager presents another and in some ways an enhanced perspective of the GUI renderer, presented above with respect to the method 100 of the FIG. 1.

At 210, the GUI manager acquires sub-hierarchies where each sub-hierarchy identifies items for sale at a specific establishment and how to perform a transaction according to rules by the specific establishment.

According to an embodiment, at 211, the GUI manager identifies the items as one or more of: menus, food categories, meals, drinks, desserts, ingredients, and recipes for restaurants that are the specific establishments.

In another case, at 212, the GUI manager obtains workflow processing customized for each specific establishment of each specific sub-hierarchy.

Continuing with the embodiment, at 213, the GUI manager uses customized promotions for each workflow processing for each specific establishment of each specific sub-hierarchy.

In an embodiment, at 214, the GUI manager identifies specific spoken languages available for each specific establishment defined in the rules.

At 220, the GUI manager organizes the sub-hierarchies into a custom hierarchy defined by a user.

According to an embodiment, at 221, the GUI manager aggregates the sub-hierarchies into the custom hierarchy based on a criterion supplied by the user.

At 230, the GUI manager renders the custom hierarchy as a GUI onto a display of a target device being used by the user.

At 240, the GUI manager interacts with the user via the GUI to select a user-selected sub-hierarchy for a user-selected establishment to perform a specific transaction.

Figure 3:
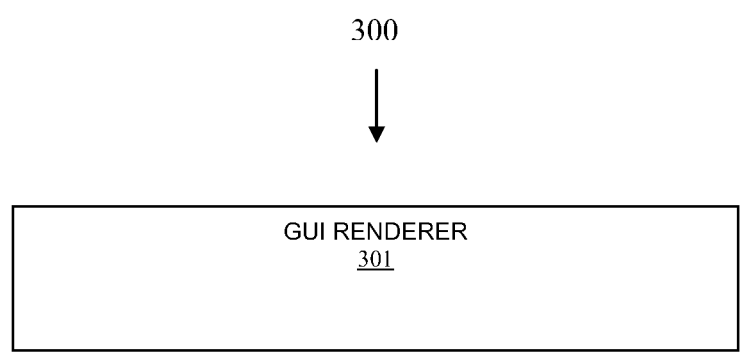
FIG. 3 is a diagram of an automated GUI rendering system, according to an example embodiment.

FIG. 3 is a diagram of an automated GUI rendering system 300, according to an example embodiment. The GUI rendering system 300 includes one or more processors that are specifically configured to perform, inter alia, the processing associated with the methods 100 and 200 of the FIGS. 1 and 2, respectively. Furthermore and in an embodiment, the GUI rendering system 300 is operational over a network and the network can be wired, wireless, or a combination of wired and wireless.

The GUI rendering system 300 includes a GUI render 301.

The GUI rendering system 300 includes a server configured with the GUI render 301. The GUI render 301 is implemented, programmed, and resides within a non-transitory computer-readable medium for execution on the server. Example processing associated with the GUI render 301 was presented above with respect to the methods 100 and 200 of the FIGS. 1 and 2, respectively.

The GUI render 301 is configured to organize sub hierarchies into a custom hierarchy accessible via a dynamically rendered GUI. Each sub hierarchy defining items for sale and how to transact with a specific establishment and the GUI render 301 initially renders the GUI to a display on a target device of a user.

According to an embodiment, the target device is a phone or a tablet.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:
   customizing a graphical user interface (GUI) for a display of a target device in accordance with a criterion, wherein features and buttons of the GUI are customized for presentation on the target device;
   displaying a hierarchy of establishments on the display by receiving with the criterion a condition for organizing the displayed hierarchy and the condition received from the user, the condition provided by the user to have the hierarchy displayed and organized in a manner the user prefers to interact with;
   interacting, via the GUI, with a user accessing the hierarchy;
   acquiring site specific GUI information and workflow processing for a specific site that identifies a specific establishment, the specific site selected by the user using the GUI, and importing at least a portion of the site specific GUI information from a Point-Of-Sale (POS) system of the specific establishment; and
   driving the GUI in accordance with selections of the user and the workflow processing to complete a transaction between the user and the specific establishment and populating the site specific GUI information with modules for the specific establishment, each module activated from selecting different portions of the site specific GUI information, and each module defining specific items, periods for selecting those items, a language for presenting, and promotions at the specific site.

2. The method of claim 1, wherein customizing further includes identifying the criterion as a profile for the user or a default setting.

3. The method of claim 1, wherein customizing further includes identifying the target device as a tablet or phone being used by the user to access the method.

4. The method of claim 1, wherein customizing further includes selecting a spoken language for presenting the GUI based on a profile or selection of the user.

5. The method of claim 1, wherein customizing further includes identifying the criterion as one of: a geographical condition, an ownership condition, and an establishment type condition.

6. The method of claim 1, wherein acquiring further includes obtaining the site-specific GUI information and the workflow processing as one or more modules for the specific establishment that identifies what is available for sale for the transaction and how to define and complete the sale.

7. The method of claim 6, wherein obtaining further includes identifying the specific establishment as a restaurant and the site-specific GUI information as a sub-hierarchy for the restaurant defining menus, meals, items, ingredients, and recipes for the restaurant.

8. The method of claim 7, wherein identifying further includes applying within the workflow processing custom promotions for the transaction specific to the restaurant.

9. The method of claim 7, wherein applying further includes presenting custom hours of operation and custom directions within the sub-hierarchy for the specific establishment.

10. The method of claim 1, wherein driving further includes conducting the transaction with the user via the target device on site at the specific establishment via a network connection.

11. A processor-implemented method programmed in a non-transitory processor-readable medium and to execute on one or more processors configured to execute the method, comprising:
acquiring sub-hierarchies, each sub-hierarchy identifying items for sale at a specific establishment and how to perform a transaction according to rules defined by that specific establishment and importing at least a portion of at least one sub-hierarchy from a Point-Of-Sale (POS) system of at least one specific establishment;
organizing the sub-hierarchies into a custom hierarchy that is dynamically defined by a user;
rendering the custom hierarchy as a graphical user interface (GUI) onto a display of a target device being used by the user based on an organization defined by the user, the user indicates the organization for the custom hierarchy in a manner the user prefers to interact with, wherein the features and buttons of the GUI are customized for the target device; and
interacting with the user via the GUI to select a user-selected sub-hierarchy for a user-selected establishment to perform a specific transaction and populating the user-selected sub-hierarchy with modules for the selected establishment, each module activated from selecting different portions of the user-selected sub-hierarchy, and each module defining specific items, periods for selecting those items, a language for presenting, and promotions at the selected establishment.

12. The method of claim 11, wherein acquiring further includes identifying the items as one or more of: menus, food categories, meals, drinks, desserts, ingredients, and recipes for restaurants that are the specific establishments.

13. The method of claim 11, wherein acquiring further includes obtaining work flow processing customized for each specific establishment of each specific sub-hierarchy.

14. The method of claim 13, wherein obtaining further includes using customized promotions for each workflow processing for each specific establishment of each specific sub-hierarchy.

15. The method of claim 11, wherein acquiring further includes identifying specific spoken languages available for each specific establishment defined in the rules.

16. The method of claim 11, wherein organizing further includes aggregating the sub-hierarchies into the custom hierarchy based on a criterion supplied by the user.

17. The method of claim 11, wherein rendering further includes dynamically populating each specific sub-hierarchy within the GUI using a hypertext markup language template.

18. A system, comprising:
a server configured with a non-transitory computer-readable storage medium and a processor;
the non-transitory computer-readable storage medium including executable instructions representing a GUI renderer;
the processor configured to execute the GI renderer from the non-transitory computer-readable storage medium; and
the GUI render configured to: i) organize sub hierarchies into a custom hierarchy accessible via a dynamically rendered GUI, each sub hierarchy defining items for sale and how to transact with a specific establishment and at least one sub hierarchy imported from a Point-Of-Sale (POS) system of the specific establishment, ii) initially render the GUI to a display on a target device of a user, and features and buttons for the GUI are customized for the target device, and the custom hierarchy rendered within the GUI to the display is custom defined by the user, the user decides an organization for the customer hierarchy in a manner in which the user prefers to interact with, and iii) populate and populate each sub hierarchy with modules for the specific establishment, each module activated from selecting items of that sub hierarchy, and each module defining specific items, periods for selecting those items, a language for presenting, and promotions at the specific establishment.

19. The system of claim 18, wherein the target device is a phone or a tablet.

* * * * *